US006481081B1

(12) United States Patent
Kilian et al.

(10) Patent No.: US 6,481,081 B1
(45) Date of Patent: Nov. 19, 2002

(54) ULTRASONIC WELD RIVET FOR PROCESS CARTRIDGE AND IN LINE TACK WELD ASSEMBLY METHOD

(75) Inventors: Leslie R. Kilian, Fairport, NY (US); Michael G. Petranto, Webster, NY (US); Beverly S. Bortnick, Rochester, NY (US); James A. Pascucci, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/542,721

(22) Filed: Apr. 4, 2000

Related U.S. Application Data

(62) Division of application No. 09/157,685, filed on Sep. 21, 1998, now Pat. No. 6,115,570.

(51) Int. Cl.[7] .............................................. G01M 19/00

(52) U.S. Cl. ............................... 29/407.01; 29/402.08; 29/525.06; 399/113

(58) Field of Search ......................... 29/402.01, 402.04, 29/402.08, 407.01, 525.06, 243.521; 399/110, 111, 112, 113, 114; 411/176

(56) References Cited

U.S. PATENT DOCUMENTS

| | | | | | |
|---|---|---|---|---|---|
| 4,953,277 | A | * | 9/1990 | Crispin et al. | 29/407.05 |
| 5,377,399 | A | * | 1/1995 | Ogawa | 29/407.01 |
| 5,381,304 | A | * | 1/1995 | Theroux et al. | 361/706 |
| 5,561,496 | A | * | 10/1996 | Sugiura et al. | 355/200 |
| 5,581,328 | A | * | 12/1996 | Yashiro | 355/111 |
| 5,619,309 | A | * | 4/1997 | Yashiro et al. | 399/111 |
| 5,638,161 | A | * | 6/1997 | Numagami et al. | 399/111 |
| 5,774,766 | A | * | 6/1998 | Karakama et al. | 399/111 |
| 5,870,654 | A | * | 2/1999 | Sato et al. | 399/109 |
| 5,890,036 | A | * | 3/1999 | Karakama et al. | 399/119 |
| 5,920,753 | A | * | 7/1999 | Sasaki et al. | 399/111 |
| 5,966,566 | A | * | 10/1999 | Odagawa et al. | 399/109 |
| 6,029,031 | A | * | 2/2000 | Yokomori et al. | 399/109 |
| 6,118,958 | A | * | 9/2000 | Nagashima et al. | 399/105 |
| 6,164,886 | A | * | 12/2000 | Matarazzo et al. | 411/176 |
| 6,173,140 | B1 | * | 1/2001 | Suzuki et al. | 399/113 |
| 6,208,818 | B1 | * | 3/2001 | Noda | 399/111 |
| 6,272,300 | B1 | * | 8/2001 | Fujiwara et al. | 399/113 |
| 6,327,448 | B1 | * | 12/2001 | Sasaki | 399/111 |

* cited by examiner

*Primary Examiner*—Gregory M. Vidovich
*Assistant Examiner*—Essama Omgba
(74) *Attorney, Agent, or Firm*—Andrew D. Ryan

(57) ABSTRACT

A process cartridge for use in a printing machine is provided. The process cartridge includes a first housing portion including a first housing attachment surface and a second housing portion including a second housing attachment surface. At least a portion of the second housing attachment surface is associated with at least a portion of the first housing attachment surface. The process cartridge further includes a plurality of rivets. Each of the plurality of rivets includes a retaining portion thereof. At least one of the first housing portion and the second housing portion define an aperture for passage of the retaining portion of at least one of the rivets therethrough. The other of at least one of the first housing portion and the second housing portion define a cavity for receiving the retaining portion of the at least one rivet. The portion of the housing defining the cavity being interferencely fitted to the retaining portion of the at least one rivet.

5 Claims, 6 Drawing Sheets

ULTRASONIC WELD RIVET FOR PROCESS CARTRIDGE AND IN LINE TACK WELD ASSEMBLY METHOD

This application is a divisional of application Ser. No. 09/157,685, filed Sep. 21, 1998 U.S. Pat. No. 6,115,570.

The present invention relates to a method and apparatus for remanufacturing process cartridges. More specifically, the invention relates to securing covers of process cartridges.

In the well-known process of electrophotographic printing, the charge retentive surface, typically known as a photoreceptor, is electro-statically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate or support member (e.g., paper), and the image affixed thereto to form a permanent record of the image to be reproduced. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways. In a printer, as the toner within the developer material is transferred to the photoreceptor and eventually to the copy paper, this used toner must be replaced. The printer thus includes a container or cartridge from which fresh toner is dispensed into the machine. To provide for a small, compact cartridge and to provide for a cartridge in which the cartridge may be easily removed, the cartridge typically has a compact shape.

Service costs represent a significant portion of the cost associated with operating a printing machine. Certain components represent those most likely to require service. By providing a method of easily replacing those certain components, the operator may replace those components himself, avoiding service technician labor costs.

These certain components are consolidated within a housing that may be easily replaced by the customer. This housing is typically called a customer replaceable unit (CRU). For example, in addition to toner, components that may be included in a CRU are the charging device (a corotron or a bias charge roll), and the photoreceptor.

A CRU may be changed several times during the life of a copy machine. While a few of the components within a CRU are consumed during the life of the CRU many of the components may be reused. Therefore, CRUs are now being frequently remanufactured rather than being made from all completely new components. The remanufacturing includes replacing spent components and inspecting all components that may wear. Worn components are replaced if so required.

Copy machines and printing machines include components that wear or become spent or consumed during normal use. For copying and printing machines such components that are consumed or become spent include developer material including toner and, if appropriate, carrier as well as the photoconductive member in the form of either a belt or a drum. Addition components may also wear during the life of the copying and printing machine. Such components include cleaning blades and brushes as well as charge corotrons and fuser rolls.

As mentioned above, to reduce service costs, improve copy quality and to improve the reliability and running time of copying and printing machines, certain components that wear, become consumed or are spent are grouped into a subassembly which may be readily replaced by a minimally trained operator. These groups of components are typically grouped into a housing which is easily insertable into the machine. These assemblies are typically called CRUs or process cartridges.

The housings in which the wear and spent components are placed to form the process cartridge typically are very durable and have a very long life. Since the process cartridge is replaced several times during the life of the machine, a large number of spent or consumed process cartridges accumulate during the life of machines, particularly those which have large quantities of machines manufactured.

During remanufacture, the process cartridges are disassembled and worn components replaced. To provide for replacement of the wear and consumable components, the housings of the process cartridges typically include upper and lower halves which are opened to install or replace components and closed after the components are replaced so the cartridge may function.

The upper and lower portions of the process cartridge housing must be securely fastened to each other. Several attempts have been made to join the upper and lower portions of a process cartridge. For example, the upper and lower portions of the cartridges may be sealed by an adhesive, for example, a glue. Also the upper and lower portions of the process cartridge may be tack welded to each other. The use of glues or tack welds in securing an upper and lower portion of a process cartridge may not provide for a secured joint. The upper and lower portions may break loose from each other when glue or tack weld is used.

Another common method of joining an upper and lower portion of a process cartridge is the use of screws, for example, self-tapping screws. Self-tapping screws have a series of problems. For example, when assembling the screws, particularly when using automated equipment, the equipment to tighten the screws may cause the screws to overtighten and strip. Further, with the use of screws, a screw can back out or become loose during shipment or use when vibration is present when the process cartridge is in use.

The following disclosures may be relevant to various aspects of the present invention:

U.S. Pat. No. 5,774,766
Patentee: Karakama et al.
Issue Date: Jun. 30, 1998

U.S. Pat. No. 5,729,795
Patentee: Kavolius et al.
Issue Date: Mar. 17, 1998

U.S. Pat. No. 5,619,309
Patentee: Yashiro et al.
Issue Date: Apr. 8, 1997

U.S. Pat. No. 5,564,847
Patentee: Patrick et al.
Issue Date: Oct. 15, 1996

U.S. Pat. No. 5,561,496
Patentee: Sugiura et al.
Issue Date: Oct. 1, 1996

U.S. Pat. No. 5,527,123
Patentee: Jackson, et al
Issue Date: Jun. 18, 1996

U.S. Pat. No. 5,311,265
Patentee: Miller
Issue Date: May 10, 1994

U.S. Pat. No. 5,296,902
Patentee: Michlin
Issue Date: Mar. 22, 1994

U.S. Pat. No. 5,774,766 discloses a process cartridge detachably mountable to a main assembly of an electrophotographic image forming apparatus comprises an electrophotographic photosensitive drum, a development roller for developing a latent image formed on the electrophotographic photosensitive drum, a toner accommodating portion for accommodating toner to be used by the development roller for development, a photosensitive drum frame for supporting the electrophotographic photosensitive drum, a development frame including the toner accommodating portion, and a support frame including a first toner leakage preventing member positioned at one longitudinal end of the development roller and a second toner leakage preventing member positioned at the other longitudinal end of the development roller. The development frame and the support frame are rotatably connected about a positioning member and, in this connected state, a portion of the development frame is welded to a portion of the support frame so that the development frame and the support frame are joined together.

U.S. Pat. No. 5,729,795 discloses electrostatographic cartridges having a cartridge base, a toner hopper having a toner fill hole attached to the cartridge base, and a gear housing assembly which blocks access to the toner fill hole and which includes an interior gear housing component integral with the cartridge base are remanufactured by severing the interior gear housing component and then reattaching it to the cartridge base through the exterior gear housing component. Specifically, the one-piece interior gear housing component is severed so that it can be removed thereby providing unobstructed access to the original toner fill hole. Most preferably, the interior part of the gear housing is cut at a five degree angle relative to the cartridge base. The angular cut thereby ensures that the attachment bosses on the cartridge base which serve to couple the base to the toner cartridge cover are not damaged to an extent that would defeat their coupling function. Paired reattachment holes are formed in the interior and exterior gear housing components to allow them to be reattached to one another via screw and nut assemblies extending therethrough. The reattached interior and exterior gear housing components may then be connected to the cartridge base by screws supplied originally with the cartridge by original equipment manufacturer (OEM). In such a manner, fresh toner may be introduced into the toner hopper in a convenient fashion during the remanufacturing operation.

U.S. Pat. No. 5,619,309 discloses a process cartridge mountable to an image forming apparatus. The apparatus includes an image bearing member, process means acting on the image bearing member, and a plurality of frames for constituting a housing for the image bearing member and the process means. A projection is provided along an abutment portion of one of the frames to be welded.

U.S. Pat. No. 5,564,847 discloses a printer having a printhead which traverses laterally across a sheet-like print medium and which thereby defines a laterally-extending print zone across the print medium. A paper transport mechanism in the printer has drive rollers and associated pinch wheels to drive the print medium through the printer's print zone. The paper transport mechanism further includes an upper print media guide and a lower print medium guide. The two print medium guides are shaped at their transverse ends to bow the transverse edges of the print medium downwardly to reduce its tendency to buckle upwardly into the printhead. In order to fit the upper print medium guide into the limited available space above the drive rollers, it is made of a lower molded portion for paper contact and an upper backing portion for rigidity. A pinch finger extends toward the printer's print zone beyond the pinch wheels to establish a pinch point against the drive roller in near proximity to the print zone. To facilitate ejection of printed pages, the upper print medium guide is formed with a series of ribs which contact the paper. The ribs reduce friction and static buildup, and make it easier to push the paper from the paper transport mechanism.

U.S. Pat. No. 5,561,496 discloses an assembling method of an image forming apparatus for forming an image on a recording material includes preparing a frame, a feeding unit having a feeding roller, electrical component unit having electrical components and an outer cover; mounting the feeding unit and the electrical component unit to the frame from a position of the frame which takes a bottom position upon installation of the image forming apparatus; and then overturning of the frame; mounting the outer cover to the frame from a position which takes a top position upon installation of the frame.

U.S. Pat. No. 5,527,123 discloses a printer having a printhead which traverses laterally across a sheet-like print medium and which thereby defines a laterally-extending print zone across the print medium. A paper transport mechanism in the printer has drive rollers and associated pinch wheels to drive the print. medium through the printer's print zone. The paper transport mechanism further includes an upper print media guide and a lower print medium guide. The two print medium guides are shaped at their transverse ends to bow the transverse edges of the print medium downwardly to reduce its tendency to buckle upwardly into the printhead. In order to fit the upper print medium guide into the limited available space above the drive rollers, it is made of a lower molded portion for paper contact and an upper backing portion for rigidity. A pinch finger extends toward the printer's print zone beyond the pinch wheels to establish a pinch point against the drive roller in near proximity to the print zone.

U.S. Pat. No. 5,311,265 discloses a toner loading system for use with reprographic machines which reduces powder clouding and minimizes toner spill during loading. A toner cartridge is mountable on a toner housing. The housing includes an opening sized to accept the cartridge. When in a raised position, the cartridge is on top of the housing. When in a lowered position, the cartridge is positioned within the housing through the opening. A removable seal on the bottom of the cartridge includes a long pull tab which can be grasped from above the housing, when the cartridge is lowered, to allow removal of the seal and allow flow of toner from the cartridge to the housing while the cartridge is extended substantially or completely within the housing, thus reducing powder clouding, providing more even toner flow, and reducing mess or spillage. The reduced powder clouding is due to a substantially reduced height from which the toner has to fall when being loaded into the housing.

U.S. Pat. No. 5,296,902 discloses an apparatus and method for providing a removable closure seal between the toner hopper and the toner feed roller compartment of a toner cartridge assembly used in printers, copy machines and facsimile machines. The seal prevents toner from leaking from the toner hopper into the feed roller compartment during shipping and handling. In one embodiment, the seal has a slotted seal insert placed over the passage between the hopper and roller compartment. A removable tape closes the slot. In another embodiment, a slotted seal insert is slid between grooves in the toner cartridge assembly into position between the hopper and feed roller compartment. The insert is attached to the cartridge assembly by glue, tape, or other adhesive. An insert tool is used to facilitate this attachment. A reusable, removable closure seal is slid between the grooves to close the slot. The closure seal may have a metal spine to increase its rigidity. A crush-resistant velvet material with a foam backing is used to improve the seals at the ends of the feed roller compartment.

As will be seen from an examination of the prior art, it is desirable to provide an electrostatographic copying system with a toner cartridge having a resealing system that is simple, reliable, and inexpensive. The present invention is directed to overcoming at least some of the aforementioned problems.

SUMMARY OF THE INVENTION

In accordance with one aspect of the present invention, there is provided a process cartridge for use in a printing machine. The process cartridge includes a first housing portion including a first housing attachment surface and a second housing portion including a second housing attachment surface. At least a portion of the second housing attachment surface is associated with at least a portion of the first housing attachment surface. The process cartridge further includes a plurality of rivets. Each of the plurality of rivets includes a retaining portion thereof. At least one of the first housing portion and the second housing portion define an aperture for passage of the retaining portion of at least one of the rivets therethrough. The other of at least one of the first housing portion and the second housing portion define a cavity for receiving the retaining portion of the at least one rivet. The portion of the housing defining the cavity being interferencely fitted to the retaining portion of the at least one rivet.

In accordance with yet another aspect of the present invention, there is provided an electrophotographic printing machine of the type including a process cartridge. The process cartridge includes a first housing portion including a first housing attachment surface and a second housing portion including a second housing attachment surface. At least a portion of the second housing attachment surface is associated with at least a portion of the first housing attachment surface. The process cartridge further includes a plurality of rivets. Each of the plurality of rivets includes a retaining portion thereof. At least one of the first housing portion and the second housing portion define an aperture for passage of the retaining portion of at least one of the rivets therethrough. The other of at least one of the first housing portion and the second housing portion define a cavity for receiving the retaining portion of the at least one rivet. The portion of the housing defining the cavity being interferencely fitted to the retaining portion of the at least one rivet.

In accordance with another aspect of the present invention, there is provided a method for manufacturing process cartridge for use in a printing machine. The method includes the steps of providing a plurality of rivets each of the rivets having a head and a retaining portion, providing a first portion of a process cartridge, the first portion defining an aperture, providing a second portion of a process cartridge, the first portion defining a cavity, passing the retaining portion one of the plurality of rivets through the aperture, inserting the retaining portion of one of the plurality of rivets into the cavity, seating the head of the one of the plurality of rivets against the first portion of the process cartridge, and securing the retaining portion of one of the plurality of rivets to the second portion of a process cartridge, thereby securing the first portion of a process cartridge to the second portion of the process cartridge.

In accordance with yet another aspect of the present invention, there is provided a method for remanufacturing a process cartridge utilizing a plurality of rivets for assembly thereof. The method includes the steps of disassembling the used process cartridge, inspecting internal components of the process cartridge, performing at least one of repairing and replacing at least one of the internal components of the process cartridge, assembling the internal components of the process cartridge into at least one of a first housing portion and a second housing portion, tack welding the first housing portion of the process cartridge to the second housing portion of the process cartridge, testing the process cartridge, breaking the tack welds if the process cartridge fails the testing step, performing at least one of repairing and replacing any components that fail at the testing step, retack welding the first housing portion of the process cartridge to the second housing portion of the process cartridge if the breaking step is required, repeating the testing step, the breaking step, the performing step and the retack welding step as required, passing the retaining portion one of said plurality of rivets through the aperture, inserting the retaining portion of one of said plurality of rivets into the cavity, seating the head of the one of said plurality of rivets against the first housing portion of the process cartridge; and securing the retaining portion of one of said plurality of rivets to the second housing portion of the process cartridge, thereby securing the first portion of the process cartridge to the second housing portion of the process cartridge.

In accordance with yet another aspect of the present invention, there is provided a rivet for use in a process cartridge for use in a printing machine. The rivet includes a body, a head attached to one end of the body and a retaining portion attached to the body and spaced from the retaining portion. The head has a shape selected to inhibit the removal of the rivet from the process cartridge by rotating the rivet with respect to the cartridge.

BRIEF DESCRIPTION OF THE DRAWINGS

The invention will be described in detail herein with reference to the following figures in which like reference numerals denote like elements and wherein.

Figure 1:
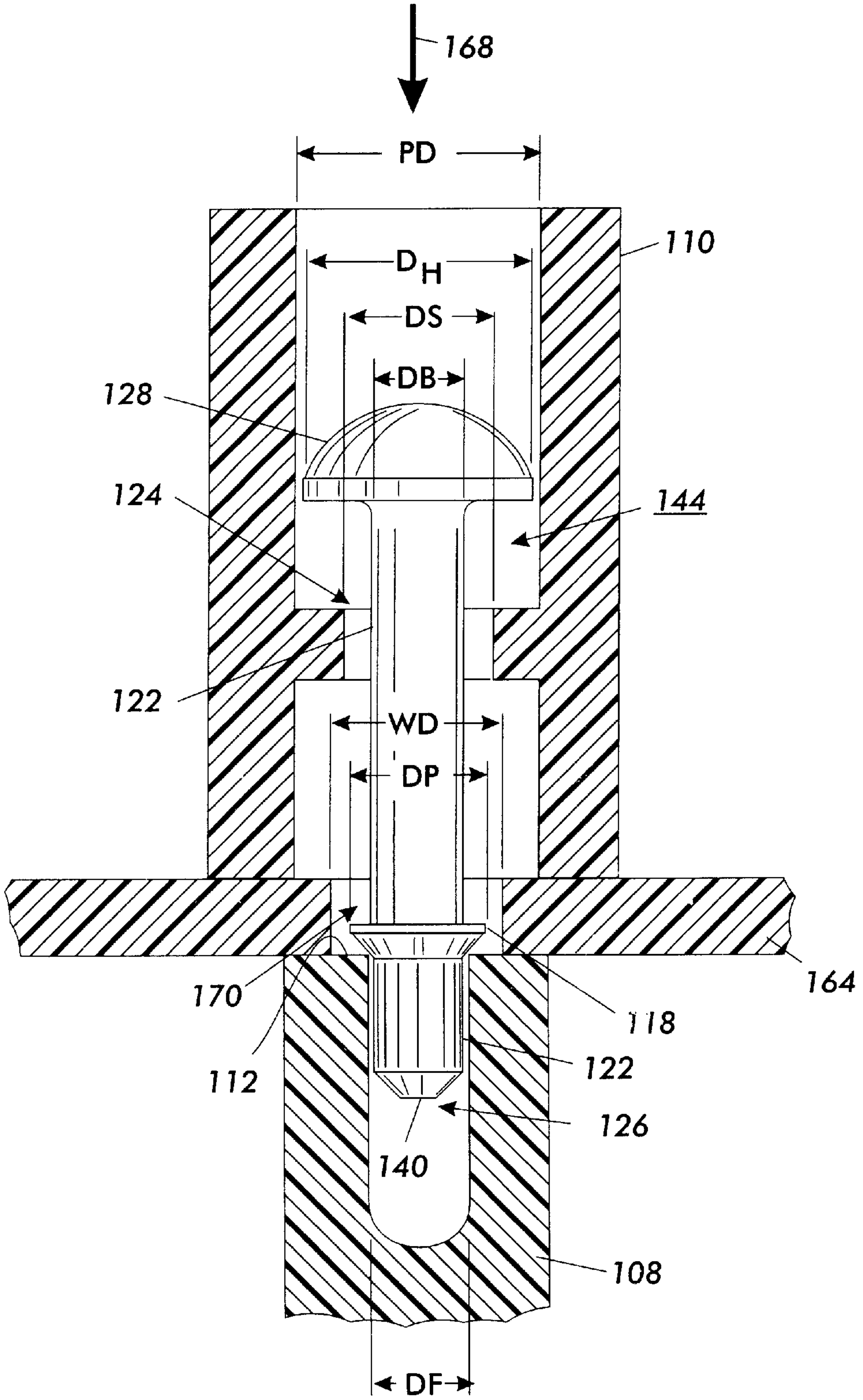
FIG. 1 is a cross section view of the customer replaceable unit of FIG. 5 showing the ultrasonic weld rivet of the present invention in a partially installed position.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

For a general understanding of the illustrative electrophotographic printing machine incorporating the features of the present invention therein, reference is made to the drawings. In the drawings, like reference numerals have been used throughout to designate identical elements.

Figure 3:
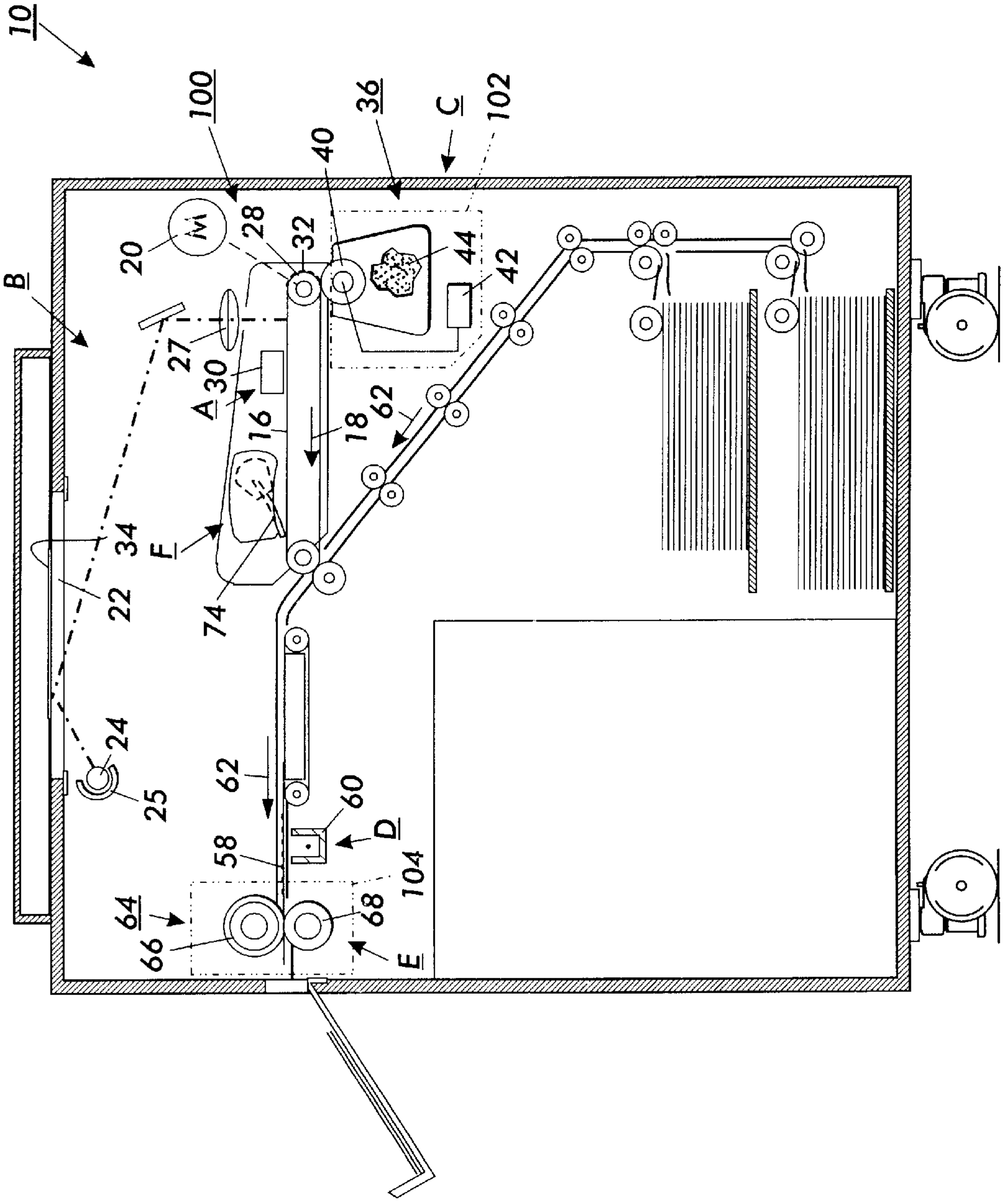
FIG. 3 is a schematic elevational view of an illustrative electrophotographic printing machine incorporating the ultrasonic weld rivet of the present invention therein.

FIG. 3 schematically depicts the various components of an electrophotographic printing machine 10 incorporating the weld rivet of the present invention therein. Although the weld rivet of the present invention is particularly well adapted for use in the illustrative printing machine, it will become evident that the integral flexible latch is equally well suited for use in a wide variety of machines where sliding or pivoting members are secured and are not necessarily limited in their application to the particular embodiments shown herein.

Referring now to FIG. 3, the electrophotographic printing machine 10 shown employs a photoconductive belt 16, although photo-receptors in the form of a drum are also known, and may be substituted therefor. The belt 16 has a photoconductive surface deposited on a conductive substrate. Belt 16 moves in the direction of arrow 18 to advance successive portions thereof sequentially through the various processing stations disposed about the path of movement thereof. Motor 20 rotates belt 16 to advance belt 16 in the direction of arrow 18. Belt 16 is coupled to motor 20, by suitable means such as a drive.

Initially successive portions of belt 16 pass through charging station A. At charging station A, a corona generating device, indicated generally by the reference numeral 30, charges the belt 16 to a selectively high uniform electrical potential. The electrical potential is normally opposite in sign to the charge of the toner. Depending on the toner chemical composition, the potential may be positive or negative. Any suitable control, well known in the art, may be employed for controlling the corona generating device 30.

A document 34 to be reproduced is placed on a platen 22, located at imaging station B, where it is illuminated in known manner by a light source such as a tungsten halogen lamp 24. The document thus exposed is imaged onto the belt 16 by a system of mirrors 25 and lens 27, as shown. The optical image selectively discharges the surface 28 of the belt 16 in an image configuration whereby an electrostatic latent image 32 of the original document is recorded on the belt 16 at the imaging station B.

It should be appreciated that the printing machine may be a digital printing machine. In a digital printing machine a ROS (Remote Optical Scanner) may lay out the image in a series of horizontal scan lines with each line having a specific number of pixels per inch. The ROS may include a laser(not shown) having a rotating polygon mirror block associated therewith. The ROS exposes the photoconductive surface of the printer.

At development station C, a development system or unit, indicated generally by the reference numeral 36 advances developer materials into contact with the electrostatic latent images. The developer unit includes a device to advance developer material into contact with the latent image.

Roll 40 in the developer unit 36 rotates in the direction of movement of belt 16 as indicated by arrow 18 and develops the charged image areas of the photoconductive surface. This developer unit contains, for example, black developer material 44 having a triboelectric charge such that the black toner is attracted to charged areas of the latent image by the electrostatic field existing between the photoconductive surface and the electrically biased developer rolls in the developer unit, which are connected to the bias power supply 42, attracts the toner to the latent image.

A sheet of support material 58 is moved into contact with the toner image at transfer station D. The sheet of support material 58 is advanced to transfer station D by conventional sheet feeding apparatus, not shown. Preferably, the sheet feeding apparatus includes a feed roll contacting the uppermost sheet of a stack of copy sheets. Feed rolls rotate so as to advance the uppermost sheet from the stack into a chute which directs the advancing sheet of support material into contact with the photoconductive surface of belt 16 in a timed sequence so that the toner powder image developed thereon contacts the advancing sheet of support material at transfer station D.

Transfer station D includes a corona generating device 60 which sprays ions of a suitable polarity onto the backside of sheet 58. This attracts the toner powder image from the belt 16 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the operator. It will also be understood that other post-fusing operations can be included, for example, binding, inverting and returning the sheet for duplexing and the like.

After the sheet of support material is separated from the photoconductive surface of belt 16, the residual toner particles carried by image and the non-image areas on the photoconductive surface are removed at cleaning station F. The cleaning station F includes a blade 74.

It is believed that the foregoing description is sufficient for purposes of the present application to illustrate the general operation of an electrophotographic printing machine incorporating the development apparatus of the present invention therein.

According to the present invention and referring again to FIG. 3, a process cartridge 100 incorporating the ultrasonic welded rivet is shown. The process cartridge 100 may include any component or combination of components utilized in the xerographic process. For example as shown in FIG. 3, the process cartridge 100 includes a corona generating device 30, the photoconductive belt 16, as well as, cleaning blade 74.

While the process cartridge 100 as shown in FIG. 3 incorporates the ultrasonic weld rivet of the present invention, it should be appreciated that other cartridges within the printing machine 10 may likewise include an ultrasonic welded rivet according to the present invention. For example, as shown in FIG. 3, the copy machine 10 further includes a development cartridge 102 and a fuser cartridge 104. It should be readily apparent that the fuser cartridge 104 and the development cartridge 102 may likewise include the ultrasonic weld rivet of the present invention as disclosed in process cartridge 100.

Figure 4:
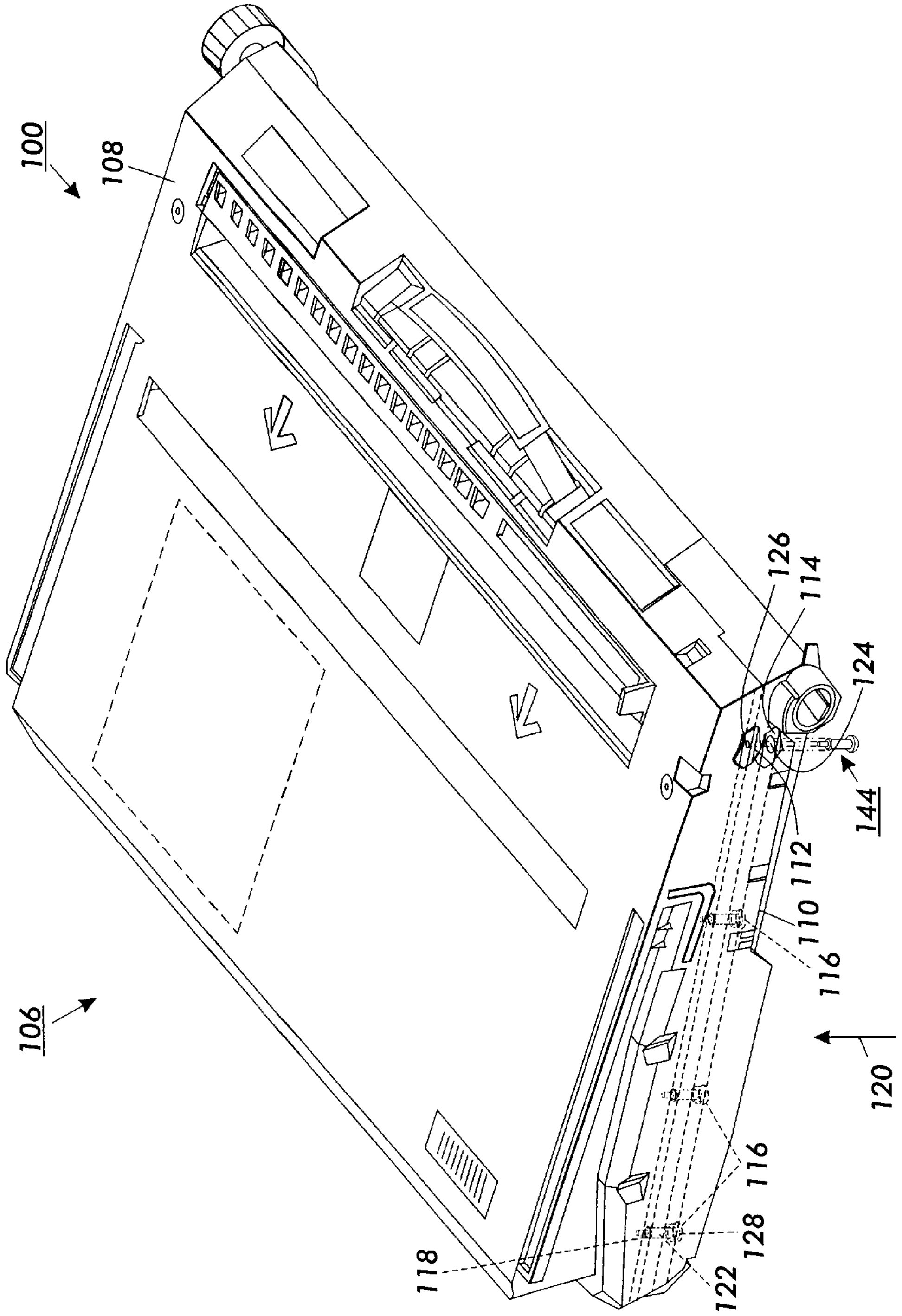
FIG. 4 is a perspective view of a customer replaceable unit incorporating the ultrasonic weld rivet of the present invention.

According to the present invention and referring now to FIG. 4, the process cartridge or customer replaceable unit (CRU) 100 including the ultrasonic weld rivet is shown in greater detail. The process cartridge 100 includes a housing 106 to which the components within the process cartridge are mounted. The process cartridge 100 may have any suitable shape. Preferably the process cartridge 100 has a shape which may be easily, removably mounted into the printing or copying machine. The process cartridge 100 may be made of any suitable durable material, for example, a plastic.

To provide access for the components within the process cartridge 100, the housing 106 includes a first housing portion 108 and a second housing portion 110. The first housing portion 108 includes a first housing attachment surface 112. The second housing portion 110 includes a second housing attachment surface 114. At least a portion of the second housing attachment surface 114 matingly fits with the first housing attachment surface 112 of the first housing portion 108. The process cartridge 100 further includes a plurality of rivets 116. Each of the rivets includes a retaining portion 118 thereof.

It should be appreciated that the rivets 116 are utilized to secure the first housing portion 108 and the second housing portion 112 to each other. It should be appreciated that the rivets 116 may be utilized by inserting the rivets 116 into either of the first housing portion 108 or the second housing portion 110 and then inserting the rivets 116 into the other of the first housing portion 108 and the second housing portion 110.

As shown in FIG. 4, the rivets 116 are inserted in the direction of arrow 120. Stem 122 of the rivet 116 is first inserted into opening 124 of the second housing portion 110 and then the stem 122 is inserted into opening 126 of the second housing attachment surface 114. The rivets 116 include the retaining portion 118 which is interferencely fitted to the opening 126 of the first housing portion 108 thereby securing the second housing portion 110 to the first housing portion 108.

Figure 6:
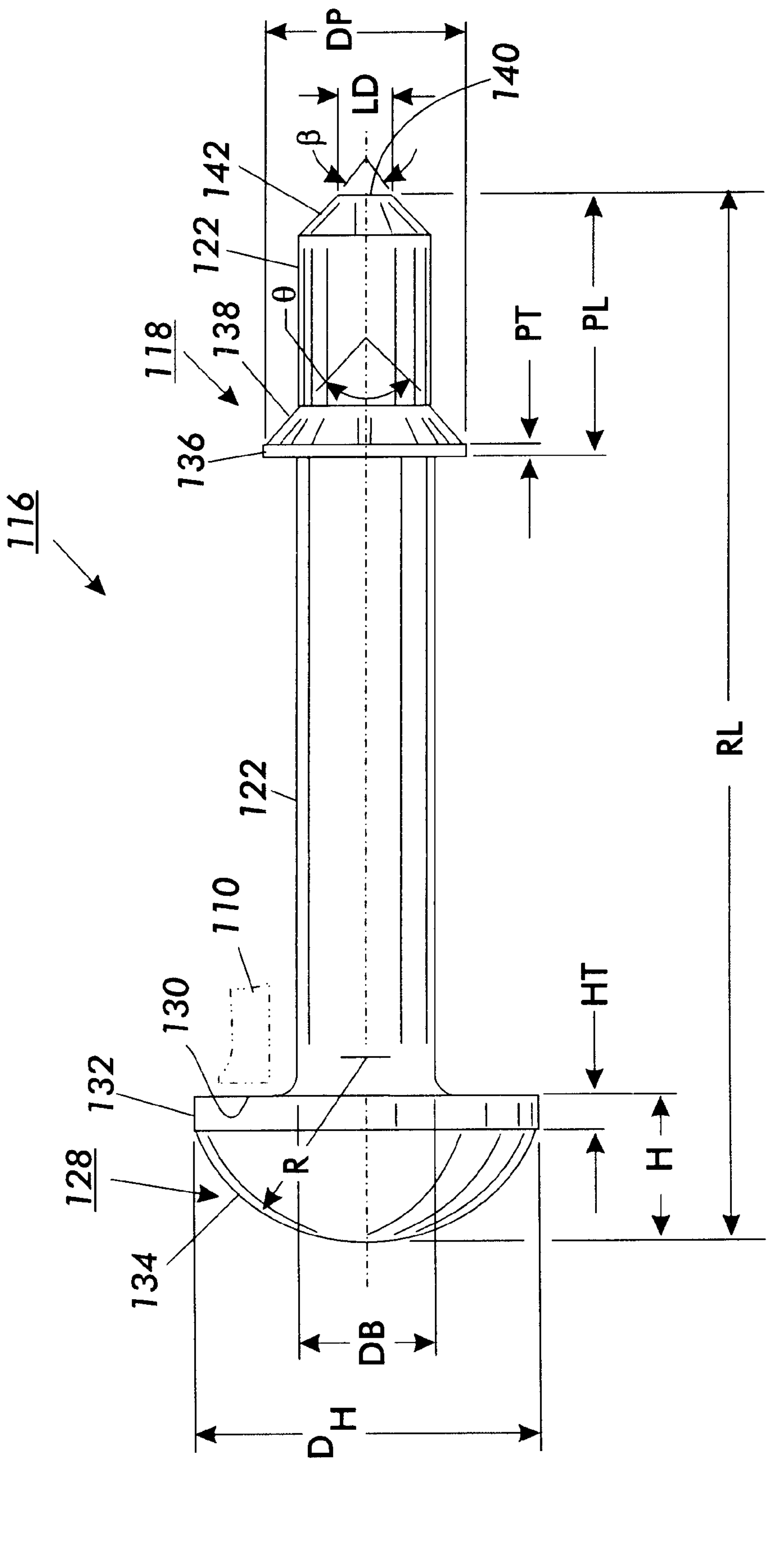
FIG. 6 is a plan view of the ultrasonic weld rivet of the present invention.

Referring now to FIG. 6, the rivet 116 is shown in greater detail. The rivet 116 includes a stem or body 122. The rivet 116 further includes a head 128 attached to one end of the body 122. The rivet 116 further includes a retaining portion 118 attached to the body 122 and spaced from the head 128. The retaining portion 118 has a shape selected to inhibit the removal of the rivet from the process cartridge 100 by rotating the rivet with respect to the cartridge.

The body 122 may have any suitable shape but for simplicity is in the form of a cylinder. The body 122 may for example, have a diameter DB of for example, 0.105 inches. It should be appreciated that the body 122 has a diameter DB sufficient to permit the rivet 116 to be fitted into the second housing opening 124 and the first housing opening 126 (see FIG. 4).

The head 128 may have any suitable configuration capable of retaining the rivet 116 against face 130 of the second housing portion 110. For example, as shown in FIG. 6, the head 120 may include a cylindrical portion 132 having a thickness HT of for example, 0.038 inches and a diameter $D_H$ of for example, 0.27 inches. The head 128 may also include a hemispherical portion 134 attached to the cylindrical portion 132 and extending therefrom. The hemispherical portion may be defined by radius R of say, for example, 3/16 inches and a height H of, for example, 0.080 inches.

The rivet 116 may have any length suitable in order to secure the first housing portion 108 to the second housing portion 110. For example, as shown in FIG. 6, the rivet 116 may have an overall length RL of for example, 0.835 inches.

The rivet 116 may utilize any retaining portion 118 capable of securing the first portion 108 to the second portion 110 and yet not permit the removal of the rivet 116 by rotation of the rivet. For example, as shown in FIG. 6, the retaining portion 118 is in the form of an annular ring. The annular ring 118 has a cylindrical portion 136 defined by diameter DP of, for example, 0.155 inches and having a width PT of, for example, 0.25 inches. To ease insertion of the ring 118 into the opening 126, the retaining portion 118 may also include a conofrustical portion 138 extending from the cylindrical portion 136. The conofrustical 138 portion 138 is defined by included angle θ of, for example, 90°. The retaining portion 118 is so positioned along the body 112 such that the retaining portion 118 is in alignment with the first housing portion 108. For example, the retaining portion 118 may extend a distance PL of 0.165 inches from second end 140 of the rivet 116 opposed to the head 128 of the rivet 116.

To assist in the assembly of the rivet 116 into the housing 106 of the process cartridge 100, preferably, the second end 140 of the rivet 116 includes a chamfer 142 defined by diameter LD of say for example, 0.035 inches and included angle β of, for example 90°.

The rivet 116 may be made of any suitable durable material. Preferably, the rivet 116 is made of a metal. To provide added strength and durability to the rivet 116, preferably, the rivet 116 is made of a hardened material. Preferably, the rivet 116 is made of a material having a hardness of Rockwell "C" scale ($R_c$) 30 or greater. Preferably, the rivet 116 is made of a carbon steel. Preferably, the rivet 116 hardened to a hardness of 40 $R_c$ to 45 $R_c$.

Figure 5:
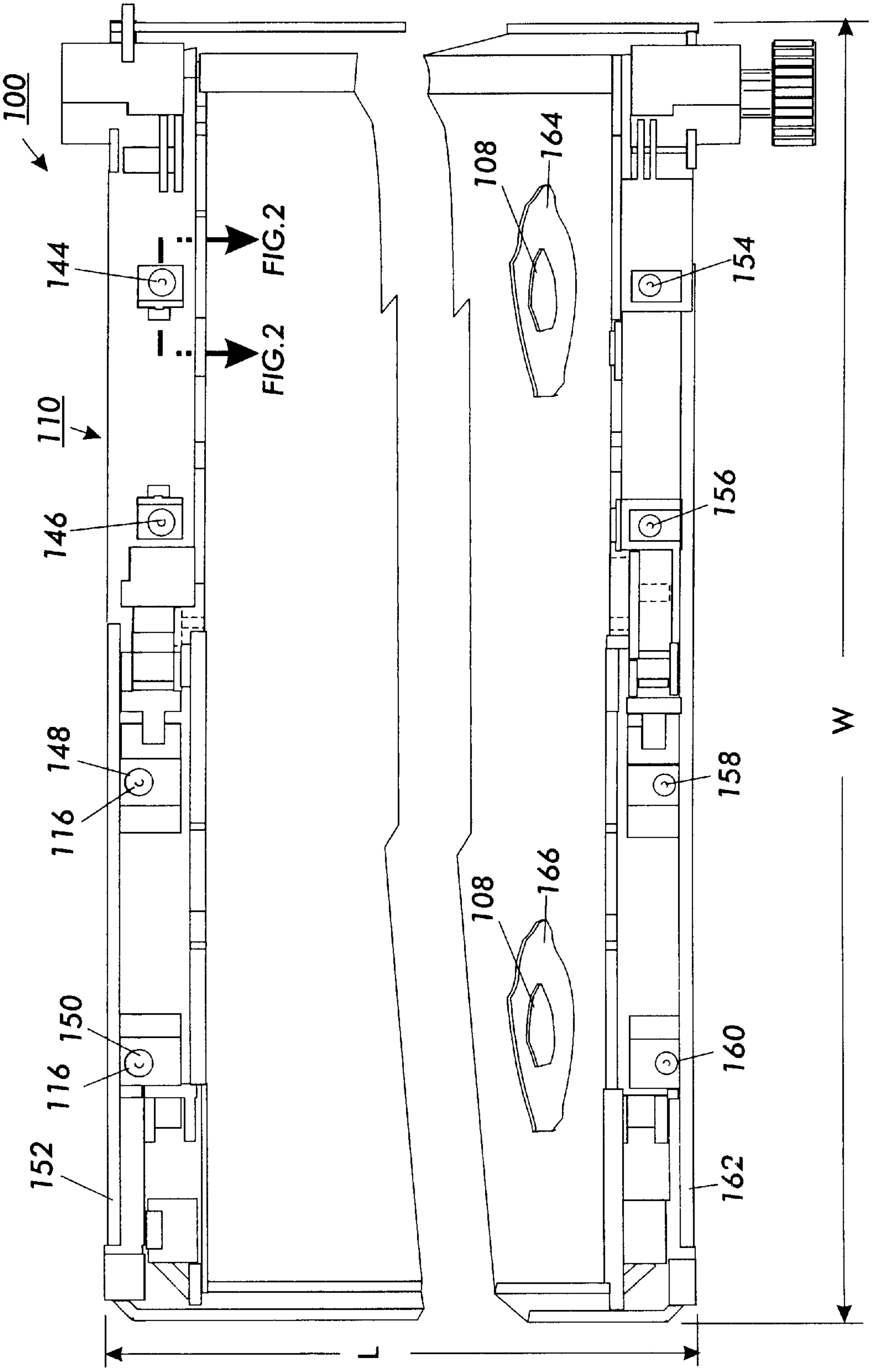
FIG. 5 is a bottom view of the customer replaceable unit of FIG. 4 showing the locations of the ultrasonic weld rivet of the present invention.

Referring now to FIG. 5, the process cartridge 100 is shown with the rivets 116 positioned about the process cartridge 100. While the invention may be practiced with as few as two rivets 116, which are spaced apart with respect to each other, such that first housing portion 108 may be secured to second housing portion 110, preferably, a larger number of rivets 116 are utilized, particularly when a process cartridge has considerable size.

For example, as shown in FIG. 5, when the process cartridge 100 has a length L of, for example, approximately 15 inches and a width W of say for example, approximately 13 inches, applicants have found that 8 spaced apart rivets 116 are sufficient for the practice of the invention.

For example, as shown in FIG. 5, the process cartridge 100 includes a first rivet 144, a second rivet 146, a third rivet 148 and a fourth rivet 150 all secured to first side 152 of the process cartridge 100. The process cartridge 100 further includes a fifth rivet 154, a sixth rivet 156, a seventh rivet 158 and an eighth rivet 160 all secured to second side 162 of the process cartridge 100. While each of the rivets 144, 146, 148, 150, 154, 156, 158 and 160 may be made of a different material and/or shape, preferably, for simplicity, each of the rivets is substantially identical to each other.

While the process cartridge 100 may be made such that the first housing portion 108 is in direct contact with the second housing portion 110 as shown in FIG. 5 the process-catice 100 may further include a first element 164 and a second element 166 positioned or sandwiched between the first housing portion 108 and the second housing portion 100. The first element 164 and the second element 166 may be made of any material and may for example and simplicity, be made of a plastic, for example polypropylene.

For example as shown in FIG. 5, the first element 164 is in the form of a wire module housing the wire corotron 30 (see FIG. 3). The second element 166 as shown in FIG. 5 may be in the form of a paper guide or baffle.

Referring now to FIG. 1, first rivet 144 is shown in installation position for securing the second housing portion 110 to the first housing portion 108. As shown in FIG. 1, the wire module 164 is positioned between the first housing portion 108 and the second housing portion 110. The first rivet 144 is installed in the direction of arrow 168 with second end 140 of the rivet 144 being first inserted into second portion opening 124 of the second housing portion 110. The opening 124 of the second housing portion 110 is defined by a diameter DS which is in clearance with diameter DP of the retaining portion 118 of the rivet 144. For example, the diameter DS may be 0.160 inches.

The rivet 144 is further installed in the direction of arrow 168 such that second end 140 of the rivet 144 passes through opening 170 in wire module 164. Opening 170 of wire module 164 has a diameter WD of, for example, 0.16 inches such that the retaining portion 118 of the rivet 144 passes through the opening 170 of the wire module 164. The second end 140 of the rivet 144 then enters first portion opening 126 of the first housing portion 108.

The body 122 of the rivet 144 has a diameter DB which is smaller than diameter DF of the first portion opening 126, for example the first portion opening 126 may have a diameter DF of for example, 0.13 inches. The diameter DF of the first portion opening 126 is smaller than diameter DP of the first rivet 144. Thus, during installation the rivet 144 moves freely in the direction of arrow 168 until it stops, as shown in FIG. 1, with the retaining portion 118 resting against the first housing attachment surface 112.

Figure 2:
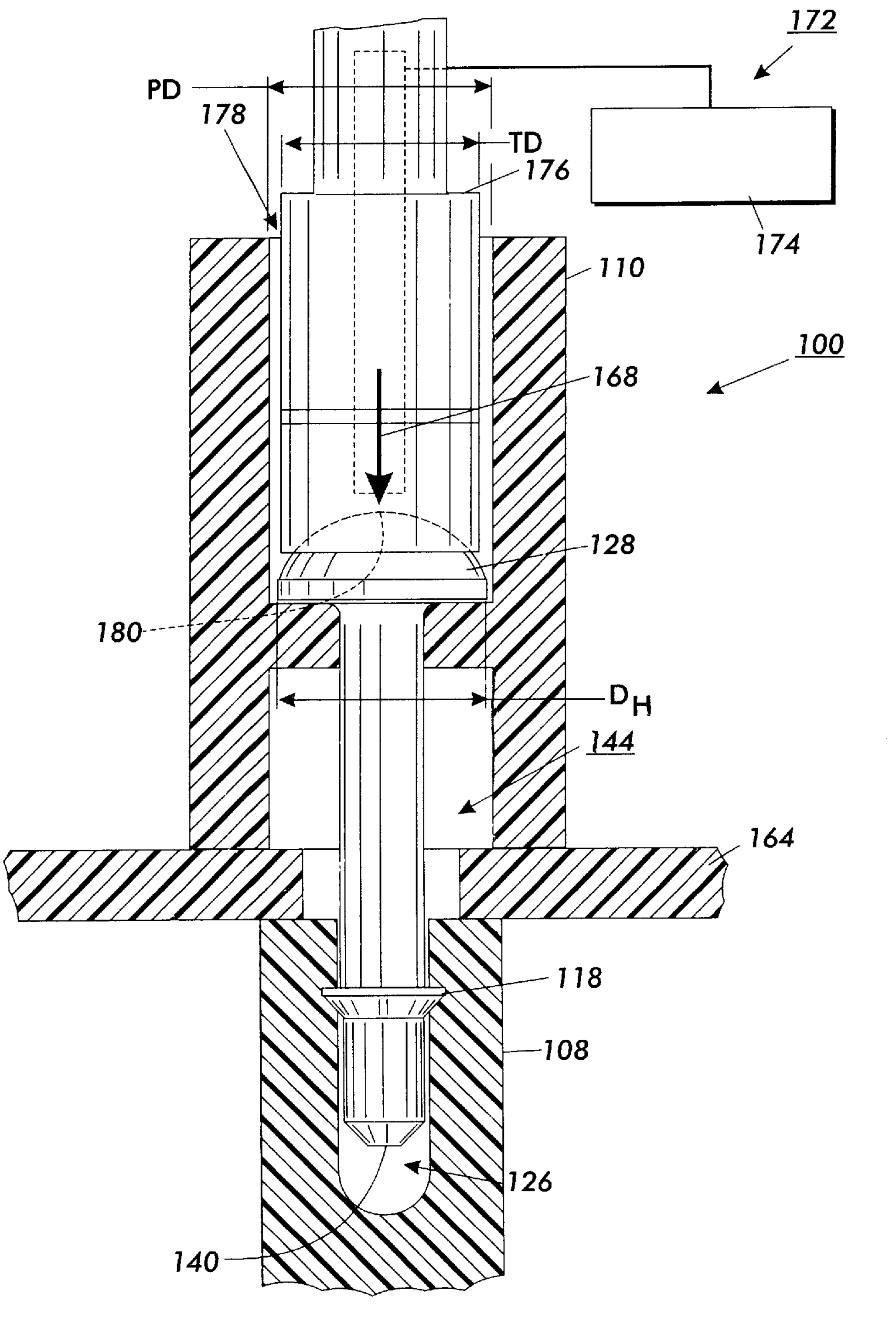
FIG. 2 is a cross section view of the customer replaceable unit of FIG. 5 along the line 2—2 in the direction of the arrows showing the ultrasonic weld rivet of the present invention in an installed position.

Referring now to FIG. 2, the first rivet 144 is shown in the installed position with head 128 of the rivet 144 securely resting against the second housing portion 110. As can be seen in FIG. 2, the retaining portion 118 of the rivet 144 is embedded within the second housing portion 108.

The retaining portion 118 of the rivet 144 may be interferencely fitted to the first housing portion 108 in any suitable fashion. Preferably, however, the retaining portion 118 of the rivet 144 is interferencely fitted to the first housing portion 108 by means of ultrasonic welding.

As shown in FIG. 2, an ultrasonic welding device 172 is shown schematically being utilized to assemble the rivet 144 to the process cartridge 100. The ultrasonic welding device 172 includes an ultrasonic force source 174 to which a tool 176 is attached. The ultrasonic welding device 172 may be any commercially available ultrasonic welding device capable of providing ultrasonic force to the rivet 144. For example, the ultrasonic welding device may be a Dukane ultrasonic welder.

The tool 176 may have any suitable shape capable of being fitted to the rivet 144 and which may be fitted into pocket 178 of the second housing portion 110. The tool 176 thus has a tool diameter TD which is smaller than pocket PD of the pocket 178 of the second housing portion 110. The tool 176 preferably includes a contact surface 180 which mates with head 128 of the rivet 144. For example, as shown in FIG. 2, the surface 180 is hemispherical and concave.

Applicants have found that the second housing portion 110 may be secured to the first housing portion 108 by utilizing the ultrasonic welding device 172 and exerting a force of approximately 20–40 pounds in the direction of arrow 168 when utilizing a protrusion 118 having a diameter DP approximately 25 thousandths larger than the diameter DF of the cavity or opening 126 in the first portion 108.

Applicants have found that it is preferable when manufacturing a process cartridge 100 utilizing the ultrasonically welded rivet of the present invention, that the components of the cartridge are assembled into the cartridge between the first housing portion 108 and the second housing portion 110. The portions 108 and 110 are then secured together in a temporary fashion in order that the functioning of the assembled process cartridge 100 may be tested. One such method of temporarily securing the first housing portion 108 and the second housing portion 110 together is by tack welding the portions 108 and 110 together to see if any problems exist with the assembled process cartridge 100 utilizing the temporary securing of the first housing portion 108 and the second housing portion 110 to each other. The process cartridge 100 is then subjected to a series of tests to determine if the process cartridge is acceptable. Next, if necessary, the process cartridge 100 may be disassembled and any defective component or problem may be corrected. After the process cartridge is found to be acceptable, the temporarily assembled process cartridge may then be permanently assembled utilizing the ultrasonic weld rivet of the present invention.

The CRU 100 is adaptable to several currently available copying machines. The CRU 100 may be used in Xerox Corporation, Stamford, Conn., model numbers 5018, 5021, 5028, 5034 5321 and 5328. The ultrasonic welded rivet of the present invention may be used in any process cartridge for any printing or copying machine.

By providing a process cartridge including the ultrasonic weld rivet of the present invention, a simple and secure assembling of the process cartridge may be obtained.

By providing an ultrasonic weld rivet according to the present invention, the housing portions of a process cartridge may be securely attached and will not become disassembled by vibration and other external factors.

By providing an in-line tack weld assembly method for testing a process cartridge by temporarily assembling the housing portions of the process cartridge and assuring the quality of the process cartridge prior to the ultrasonic weld rivet, a permanently secured quality cartridge may be provided.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A method for manufacturing a process cartridge for use in a printing machine, the method comprising the steps of:
   - providing a plurality of rivets each of the rivets having a head and a retaining portion, the retaining portion including a conical member spaced from the head;
   - providing a first portion of a process cartridge, the first portion defining an aperture;
   - providing a second portion of a process cartridge, the second portion defining a cavity;
   - passing the retaining portion of one of said plurality of rivets through the aperture;
   - inserting the conical member of the retaining portion of one of said plurality of rivets into the cavity;
   - seating the head of the one of said plurality of rivets against the first portion of the process cartridge; and
   - securing the retaining portion of one of said plurality of rivets to the second portion of the process cartridge, thereby securing the first portion of the process cartridge; wherein prior to inserting the conical member of the retaining portion, a diameter of the conical member is greater than an opening of the cavity to the second portion of the process cartridge.

2. A method for manufacturing a process cartridge for use in a printing machine, the method comprising the steps of:

providing a plurality of rivets each of the rivets having a head and a retaining portion;

providing a first portion of the process cartridge, the first portion defining an aperture;

providing a second portion of the process cartridge, the second portion defining a cavity;

passing the retaining portion one of said plurality of rivets through the aperture;

inserting the retaining portion of one of said plurality of rivets into the cavity;

seating the head of the one of said plurality of rivets against the first portion of the process cartridge; and securing the retaining portion of one of said plurality of rivets to the second portion of the process cartridge, thereby securing the first portion of the process cartridge to the second portion of the process cartridge; wherein the securing step comprises ultrasonically welding the rivet to the second portion of the process cartridge.

3. A method for manufacturing a process cartridge for use in a printing machine, the method comprising the steps of:

providing a plurality of rivets each of the rivets having a head and a retaining portion;

providing a first portion of the process cartridge, the first portion defining an aperture;

providing a second portion of the process cartridge, the first portion defining a cavity;

passing the retaining portion one of said plurality of rivets through the aperture;

inserting the retaining portion of one of said plurality of rivets into the cavity;

seating the head of the one of said plurality of rivets against the first portion of the process cartridge;

securing the retaining portion of one of said plurality of rivets to the second portion of the process cartridge, thereby securing the first portion of the process cartridge to the second portion of the process cartridge;

aligning the first portion to the second portion, prior to the passing step;

tack welding the first portion to the second portion, after the aligning step; and testing the process cartridge to determine if it meets acceptance criteria.

4. A method for remanufacturing a used process cartridge utilizing a plurality of rivets for assembly thereof, the process cartridge for use in a printing machine, the method comprising the steps of:

disassembling the used process cartridge;

inspecting internal components of the process cartridge;

performing at least one of repairing and replacing at least one of the internal components of the process cartridge;

assembling the internal components of the process cartridge into at least one of a first housing portion and a second housing portion;

tack welding the first housing portion of the process cartridge to the second housing portion of the process cartridge;

testing the process cartridge;

breaking the tack welds if the process cartridge fails the testing step;

performing at least one of repairing and replacing any components that fail at the testing step;

retack welding the first housing portion of the process cartridge to the second housing portion of the process cartridge if the breaking step is required;

repeating the testing step, the breaking step, the performing step and the retack welding step as required;

passing a retaining portion one of said plurality of rivets through the aperture;

inserting the retaining portion of one of said plurality of rivets into the cavity;

seating a head of the one of said plurality of rivets against the first housing portion of the process cartridge; and securing the retaining portion of one of said plurality of rivets to the second housing portion of the process cartridge, thereby securing the first portion of the process cartridge to the second housing portion of the process cartridge.

5. The method as in claim 4 wherein said securing step comprises ultrasonically welding the rivet to the second housing portion of the process cartridge.

* * * * *